United States Patent
Hsiang

(10) Patent No.: US 8,643,651 B2
(45) Date of Patent: Feb. 4, 2014

(54) TYPE-SETTING METHOD FOR A TEXT IMAGE FILE

(76) Inventor: Jieh Hsiang, Taipei (TW)

( * ) Notice: Subject to any disclaimer, the term of this patent is extended or adjusted under 35 U.S.C. 154(b) by 901 days.

(21) Appl. No.: 12/818,802

(22) Filed: Jun. 18, 2010

(65) Prior Publication Data

US 2011/0310103 A1     Dec. 22, 2011

(51) Int. Cl.
*G06T 11/00*     (2006.01)

(52) U.S. Cl.
USPC .......................... 345/467; 345/468; 345/551

(58) Field of Classification Search
None
See application file for complete search history.

(56) References Cited

U.S. PATENT DOCUMENTS

| 6,324,554 | B1 * | 11/2001 | Watanabe et al. | 715/235 |
| 2002/0149578 | A1 * | 10/2002 | Atkins | 345/418 |
| 2003/0123730 | A1 * | 7/2003 | Kim et al. | 382/177 |

FOREIGN PATENT DOCUMENTS

JP     11015991 A *   1/1999 ............. G06T 11/60

* cited by examiner

*Primary Examiner* — Jwalant Amin
(74) *Attorney, Agent, or Firm* — Muncy, Geissler, Olds & Lowe, PLLC

(57) ABSTRACT

The present invention discloses a type-setting method for a text image file, which comprises steps of: dividing the text image file into a plurality of character-string images along a first direction according to the reading sequence; dividing each character-string image into a plurality of independent and individual character images along a second direction; type-setting and line-feeding the independent and individual character images in light of the dimension of a reading interface. Thereby, the present invention efficiently shows text images according to the reading interface and provides the reading convenience without often dragging both the horizontal and vertical scrollbars to adjust the shown texts on the screen of the reading interface.

9 Claims, 6 Drawing Sheets

TYPE-SETTING METHOD FOR A TEXT IMAGE FILE

FIELD OF THE INVENTION

The present invention describes a type-setting method for a text image file which performs type-setting and line-feeding automatically according to the different reading interface dimensions of various information loaders.

BACKGROUND OF THE INVENTION

"E-book" or "electronic book" is a general term for the combination of an e-reader and the digital contents inside the e-reader. The current trend is towards replacing the conventional paper books by E-books. According to the Oxford Dictionary, "an e-book is the electronic edition of a printed book, which can be read from a personal computer or a hand-held device". The hardware reading interface is generally called an "e-reader". Personal computers and certain mobile phones may be used as e-readers.

An e-book can be read from different types of e-readers (interchangeably, called information loaders). Accordingly, producing a digital file that can be read from various e-readers is a critical challenge for digital publishing.

Most of the existing books are printed on paper with ink, which cannot be read electronically by e-readers. One general solution to the problem is to scan the paper books into output image files that can be loaded and displayed on an e-reader. However, the scanned image files cannot be loaded to automatically perform line-feeding according to the view dimension of the reading interface. Accordingly, the user cannot read the entire page when loading a scanned image file directly unless he/she frequently drags a vertical or/and horizontal scrollbar(s) or changes the view dimensions. That results in a time-consuming and sometimes frustrating reading experience.

The electronic translation technology using OCR (Optical Character Recognition) is a potential solution for aforementioned problem. OCR electronically transcribes an image file into an editable digital text file that can be loaded and line-fed according to the view dimensions of the reading interface.

A basic requirement of a workable OCR is the ability to correctly recognize the text embedded in an image file. As English language has a limited number of letters and punctuation marks, a good OCR system for English texts can recognize almost 100% of the scanned text files. However, the performance of OCR systems for ideographic languages or block languages such as traditional Chinese, simplified Chinese, Japanese, and Korean are much less satisfactory due to the large set of characters that an OCR system is required to handle. To achieve a readable level of correctness, the transcribed text resulting from OCR for Chinese texts must be proofread by human beings and corrected manually. The significant overhead required in the proofreading step made OCR an unacceptable solution for converting the enormous quantity of existing paper books of ideographic languages into electronically readable e-books. We further remark that if the text image file is only for reading but not for editing, as it is the case in most e-book applications, electronic recognition of characters may altogether be unnecessary.

SUMMARY OF THE INVENTION

One objective of the present invention is to provide a type-setting method for a text image file, which can perform type-setting and line-feeding automatically according to the different reading interface dimensions of various information loaders.

Another objective of the present invention is to provide a type-setting method for a text image file, which does not require an OCR system to recognize individual characters, thus reducing the overhead incurred with OCR. The present invention partitions a text image file into individual character images and dynamically displays them according to different view dimensions of different readers. It can consequently save the enormous manpower necessary on proofreading text files generated by OCR, and also avoid the inconvenience and inflexibility of view-size adjustment in displaying a scanned text image files on different e-readers.

The present invention proposes a type-setting method for a text image file, which comprises the following steps: dividing a text image file into a plurality of character-string images along a first direction according to the reading sequence; dividing each character-string image into a plurality of independent character images along a second direction; automatically type-setting and line-feeding the independent and individual character images according to the view dimension of the reading interface.

In one embodiment, the present invention records the black-pixel row arrays and black-pixel column arrays of a text image file to locate the upper, lower, left and right borders of each character in the text image file so that the individual characters from the text image files can be separated and type-set to perform automatic line-feeding according to the view dimension of the reading interface.

In one embodiment, the present invention stores the reading sequence and paragraphing information of the original text image file, retrieves and shows them when type-setting and printing.

DETAILED DESCRIPTION OF THE PREFERRED EMBODIMENTS

The technical contents will be described in detail with the embodiments below. However, the persons skilled in the art should understand that the embodiments are only to exemplify the present invention but not to limit the scope of the present invention, and that any equivalent modification or variation according to the spirit of the present invention is to be also included within the scope of the present invention.

The type-setting method for a text image file of the present invention comprises two primary processes: a text dividing process and a type-setting process. In the text dividing process, the present invention divides the text image file into a plurality of independent and individual characters, and stores the characters in image formats and their related information. In the type-setting process, the present invention performs type-setting and automatic line-feeding of the divided characters in light of the view dimension of the reading interface. Thereby, the present invention efficiently shows text images according to the reading interface and provides the reading convenience without often dragging both the horizontal and vertical scrollbars to adjust the shown texts on the screen of the reading interface.

In the present invention, the "text image file" refers to a file format that cannot be edited directly, for example, a "pdf" (portable document format) file or a "tiff" (tagged image file format) file. Although the title of the present invention regards a "text" image file, the present invention is not restricted to a file which entirely contains text images.

Figure 1:
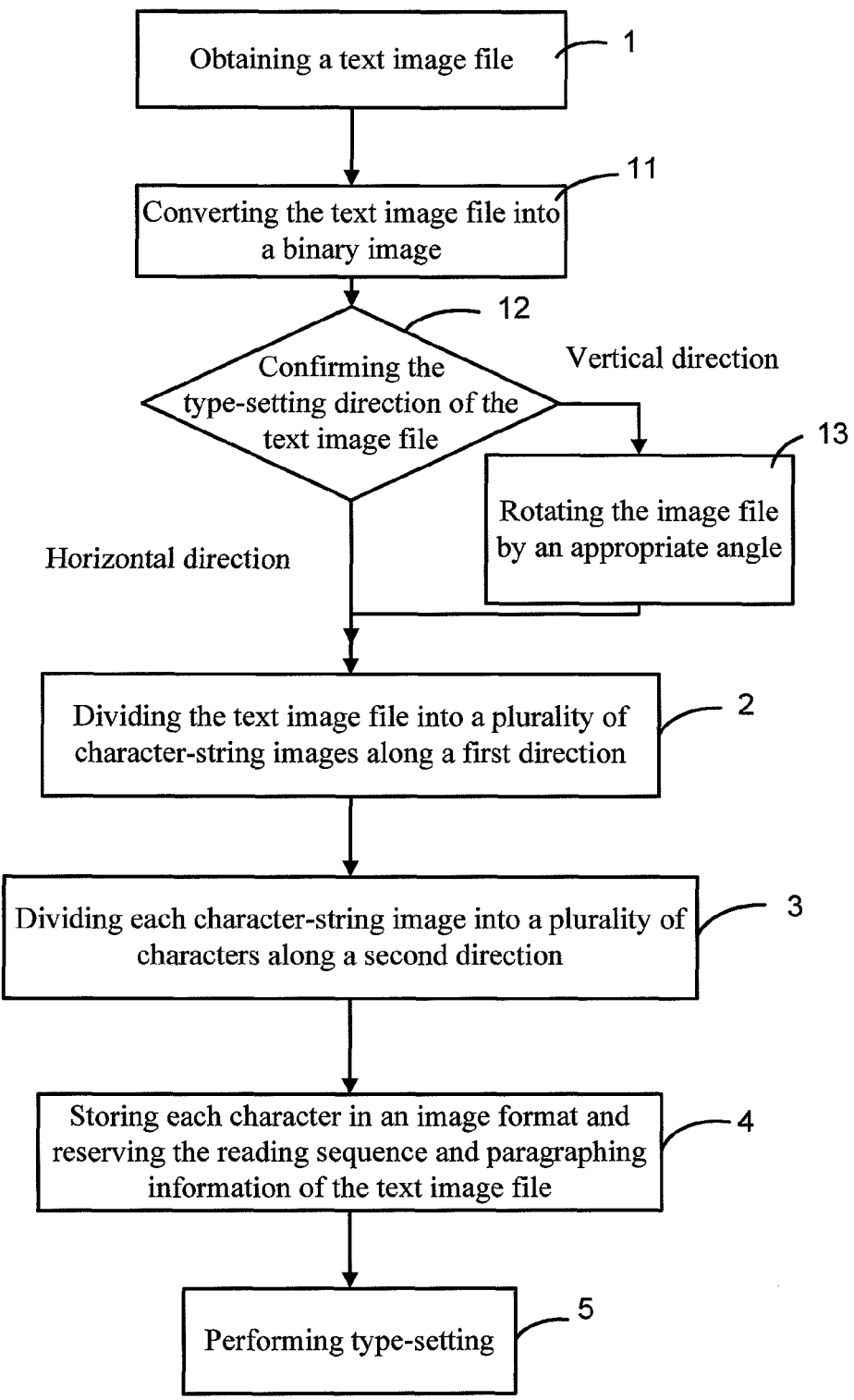
FIG. 1 is a flowchart of the text dividing process according to one embodiment of the present invention.

Please refer to FIG. 1, it shows a flowchart of the text dividing process according to one embodiment of the present invention. The text dividing process comprises Step 1: obtaining a text image file; Step 2: dividing the text image file into a plurality of character-string images along a first direction; Step 3: dividing each character-string image into a plurality of characters along a second direction; Step 4: storing each character in an image format and reserving the reading sequence and paragraphing information of the text image file; Step 5: performing type-setting.

Firstly, regarding Step 1, a text image file is obtained and the width W1 and height H1 of the image are captured simultaneously. Next, in Step 2, the text image file is divided into a plurality of character-string images along a first direction according to the reading sequence of the text image file. In Step 3, each character-string image is divided into a plurality of characters along a second direction according to the reading sequence of the character-string images. In Step 4, each character is stored in an image format, and the original reading sequence and the paragraphing information are also reserved. In Step 5, the divided characters are type-set individually.

In one embodiment of the present invention, it further comprises Step 11 (right after Step 1): converting the text image file into a binary image to decrease the file size, whereby the storage space and processing time of the present invention can be accordingly reduced. In the so-called binary image, all colors are converted into black or white only.

In the embodiment, the present invention further comprises two steps before Step 2: confirming the type-setting direction of the text image file (Step 12) and rotating the image file by an appropriate angle (Step 13) according to Step 12. By the pre-processing of Step 12 and Step 13 before dividing process, regardless of the type-setting orientation, for example, the present invention may use the horizontal direction as the first division direction and the vertical direction as the second division direction to simplify and unify the dividing process thereafter. In one example, if the original text image file is a vertical-type-setting file that needs to read from right to left, the appropriate angle applied to the image file is 90 degrees counterclockwise. After the rotation, the vertical-type-setting file can be divided in the same way as a horizontal-type-setting file.

However, the pre-processing of Step 12 and Step 13 is not essential to the present invention. In other embodiments, the first dividing direction and the second dividing direction in Step 2 and Step 3 can be determined by the type-setting orientation of an image file freely. In one case, if the original text image file has a horizontal type-setting orientation, the first dividing direction is defined to be horizontal, and the second direction is defined to be vertical. However, if the original text image file has a vertical type-setting orientation, the first dividing direction does not need to be horizontal as the first case does. It can be defined to be vertical, and the second direction is defined to be horizontal. As a result, regardless of the type-setting orientation to be vertical or horizontal, after the divisions along the first and second directions, the original text image file can be divided into a plurality of independent and individual character images.

Figure 2:
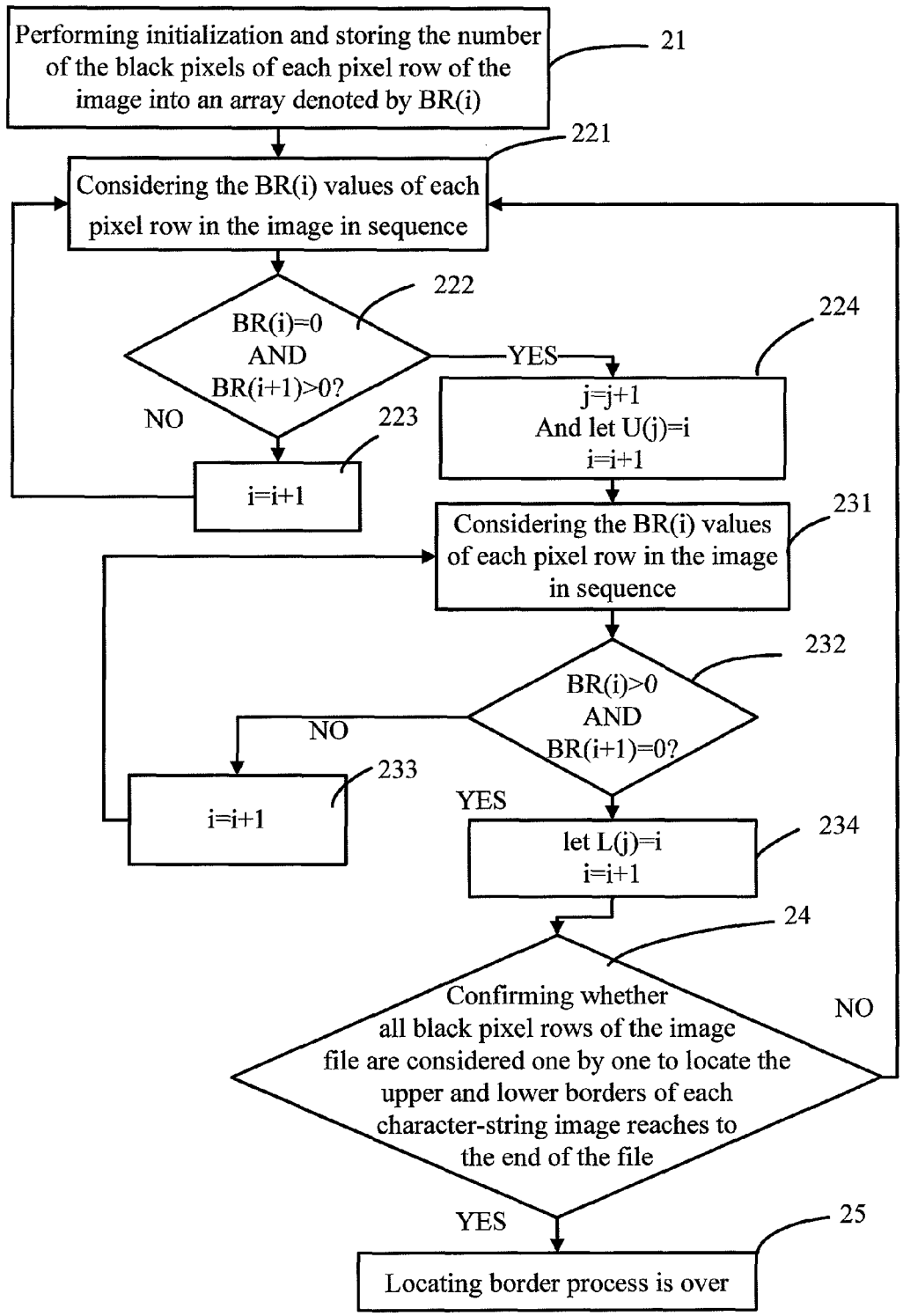
FIG. 2 is a flowchart of dividing a text image file into a plurality of character-string images along a first direction according to one embodiment of the present invention.

Please refer to FIG. 2 which is a flowchart of dividing a text image file into a plurality of character-string images along a first dividing direction according to one embodiment of the present invention. In this embodiment, the method of the present invention scans and reads the black portions of the images to define the upper and lower borders of each character-string image. Next, the text image file is divided into a plurality of character-string images by the upper and lower borders. However, other dividing methods may be used to obtain the same result. For example, the white portions of the images instead can be read to define the dividing borders. In order for an easy and clear description, we unify that the first direction of division is the horizontal direction in FIG. 2 and the text image file is converted into the binary black-and-white image as described in Step 11.

In Step 21, the initialization is first performed and the number of the black pixels of each pixel row of the image is stored into an array denoted by BR(i), wherein i is the index of the pixel row. For example, BR(8)=1000 denotes that the pixel row with an index of 8 has 1000 black pixels. The index i increases with the reading sequence. The distribution and borders of the characters in the text image file can be learned and located by recording of the number of the black pixels. In one embodiment, considering an old book usually has noises, such as stains and marks, before recording the number of the black pixels, a pre-processing step can be performed to decrease the noises to achieve the correctness of obtaining borders of the characters.

Next, in order to perform the first division, the upper and lower borders of each character-string image should be obtained. The BR(i) values of each pixel row in the image are considered in sequence (Step 221). If the value of one pixel row, BR(i), is zero, it implies that the image corresponding to BR(i) is blank. Such a case is referred to "zero-element" in the present invention. Thus, if BR(i) is equal to zero and its next pixel row, BR(i+1), is greater than zero (Step 222), the case implies that the pixel row of an index (i+1) is the first black pixel row right after the all-white pixel row. In that condition, the pixel row of the index (i+1) may be regarded as the initial border (or upper border) of the jth character-string image, and the information of the pixel row, such as indices i and j, is recorded as the upper border U(j) (Step 224), wherein j is the index of a character-string image. On the contrary, if the condition in Step 222 is not satisfied, the process loops to confirm the next pixel row (Step 223).

After locating the upper border of the jth character-string image, the lower border of the same character-string image can be also found in a similar way. In Step 231, after locating an upper border, sequentially consider the BR(i) values after the upper border. If the BR(i) value of one pixel row is greater than zero and if the value of its next pixel row, BR(i+1), is zero (Step 232), it implies that the pixel row with an index of (i+1) is the first all-white pixel row (zero element) right after the black pixel rows. Therefore, the all-white pixel row, BR(i+1), is regarded as the end border (or lower border) of the jth character-string image, and the information of the pixel row, such as indices i and j, is recorded as the lower border L(j) (Step 234). On the contrary, if the condition in Step 232 is not satisfied, the process loops to Step 233 to check the next pixel row. All black pixel rows of the image file are considered one by one to locate the upper and lower borders of each character-string image until the end of the file (Step 24) and locating border process is over (Step 25).

In one embodiment, if the black row pixel array BR(i) does not contain any negative element, the upper and lower borders can be found out by checking the boundaries of zero and non-zero elements of BR(i). In another embodiment, in order to filter the noises, such as stains or marks, in the image file, the zero-check of branch-condition, in FIG. 2, can be replaced by a threshold k. Namely, the upper and lower borders of a pixel row is not determined by the blank image, i.e. the zero element (i.e. BR(i)=0). Instead, if BR(i)<k, the pixel row is regarded as an all-white pixel row that does not contain any character.

The division along the second direction can be undertaken in a way similar to the division along the first direction shown in FIG. 2: sequentially record black pixels of each column of the character-string image to an array denoted by BC (m), wherein m is an index of a column index of the character-string image. The column index m increases with the reading sequence. Suppose that the reading sequence of the character-string image is from left to right. When BC(m)=0 and BC(m+1)>0, the left border L of a character can be first located. Let n be a column index of one character-string image. The right side of the character needs to satisfy n>m. When BC(n)>0 and BC(n+1)=0, the right border R of the character can also be located. Defined by the left and right border together with the upper and lower borders as found out earlier, an individual character can be decomposed and separated.

In one embodiment, if the black column pixel array BC(m) does not contain any negative element, the left and right borders can be located by checking the boundaries of zero and non-zero elements of BC(m).

Considering some special characters which cause division errors, the present invention may comprise post-processing steps to correct errors of divisions and output accurate results. For example, the central blank portion of the block character "北" may cause a division error to separate "北" into two characters. Indeed, it is only one word, representing "north" in its meaning. In order for such a division error, in one embodiment of the present invention, a combination coefficient is set to adjust the division results. Regarding a special character, suppose that its left and right borders are respectively denoted as L and R, and the upper and lower borders of the character are respectively U and L. If (R−L)<a×(L−U) where "a" is a positive combination coefficient, such as ¾, it implies that the left and right widths of the divided character are smaller than a given proportion of one of the upper and lower heights. For the next character, suppose that its left and right borders are respectively denoted as L' and R' and the upper and lower borders of the next character are respectively U' and L'. Again, if (R'−L')<a×(L'−U'), it implies that the left and right widths of the next character are also smaller than a given proportion of the upper and lower heights of the next character. In that occasion, the current character and its next character may actually belong to a single special character containing two parts. Accordingly, the present invention proposes an embodiment in which, when the left and right widths of two successive characters are smaller than a given proportion of the upper and lower heights thereof, the two successive characters may be combined and output as one character only.

In Step 4 of FIG. 1, after the image is divided into individual characters, the reading sequence of the characters and the paragraphing information should be retained and reserved. In Step 5, the reading sequence of the characters and the paragraphing information are retrieved in the type-setting. Generally, a new paragraph may be presented in the following occasions: (a) the spacing between the current character-string image and the preceding character-string image is larger; (b) the beginning of a character-string image has a blank indentation; (c) the end of a character-string image has a blank, etc. In case (a), the present invention reads and judges whether the difference between the upper border of the current character-string image U(i+1) and the lower border of the preceding character-string image L(i) is greater than a threshold "t1", represented as U(i+1)−L(i)>t1 "t1" is a constant, such as the character-string image height of the highest appearance probability. In other words, when the spacing between the current character-string image and the preceding character-string image is greater than the character-string image height of the highest appearance probability, it may imply that the two character-string images belong to two different paragraphs. Accordingly, a paragraph symbol can be inserted between the two character-string images.

Case (b) is another occasion. The first character in the ith character-string image is located. Namely, BR(m)>0 is found. Next, a blank threshold "t2" is set. Then, if m>t2×(L(i)−U(i)), it implies that the initial blank of the character-string image is greater than "t2" times the character-string image height. In such a case, a paragraph symbol may be inserted before the ith character-string image.

Case (c) is still another case. First, the end of the ith character-string image is located, i.e. satisfying the condition where BC(n)>0 and BC(n+1)=0. Next, an end threshold t3 is set. The difference between the image width W1 (obtained from Step 1 in FIG. 1) and the character portion in the character-string image is obtained. In other words, the end blank portion in the character-string image is calculated. If the end blank portion of the character-string image is greater than t3 times the character-string image height, represented as W1−m>t3×((L(i)−U(i)), a paragraph symbol may be inserted after the ith character-string image.

So far, the present invention has divided a text image file into a plurality of individual and independent characters and stored the reading sequence, border information, and paragraphing information which can be retrieved and used later on in Step 5 for type-setting.

Figure 3:
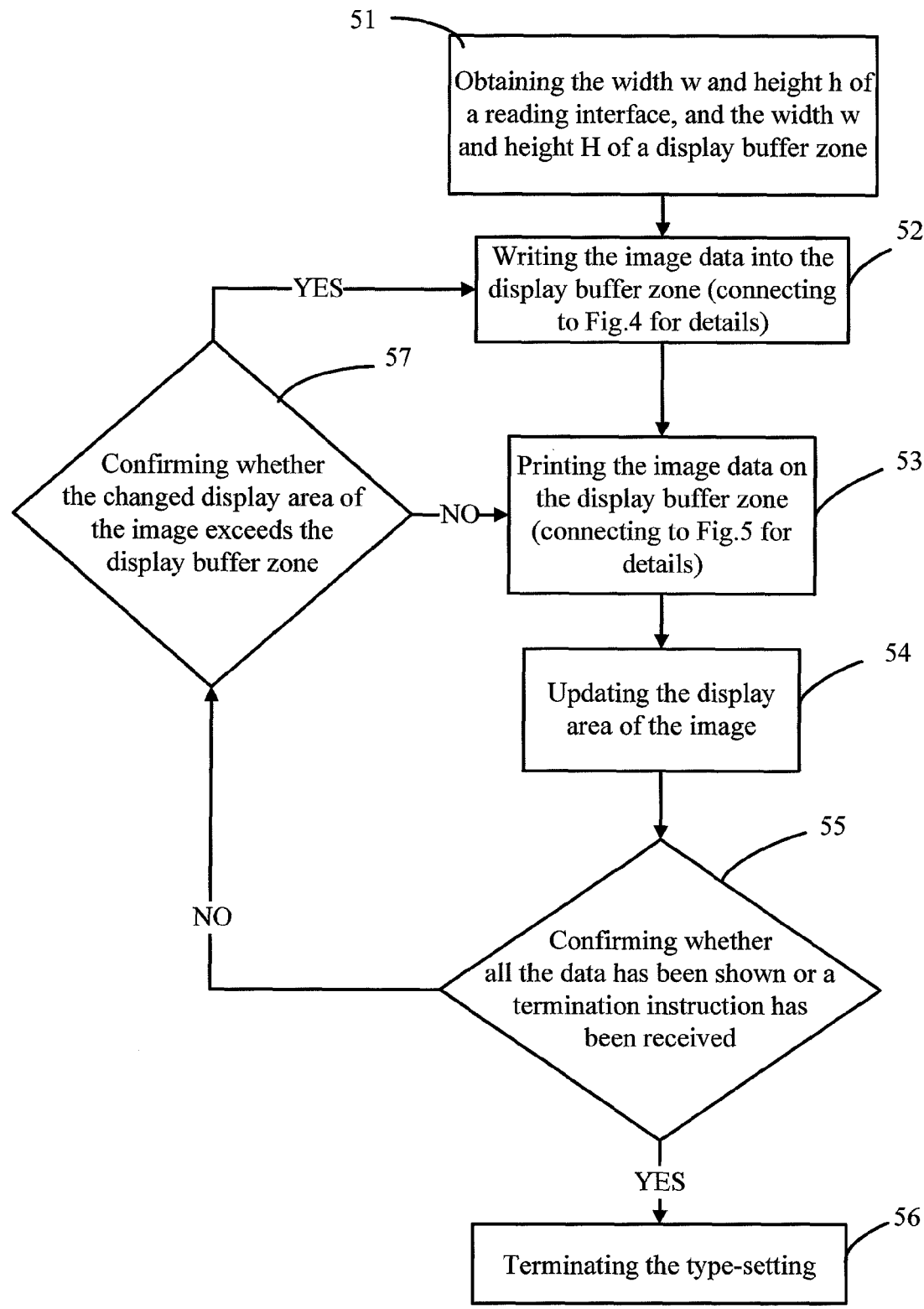
FIG. 3 is a flowchart of type-setting the individual character images in a reading interface after the division of a text image file according to one embodiment of the present invention.

FIG. 3 is a flowchart of type-setting the individual character images in a reading interface after the division of a text image file according to one embodiment of the present invention. The sub-steps of Step 5 are shown in FIG. 3. For type-setting and automatically line-feeding corresponding to various dimensions of reading interfaces, first, the width w and height h of a reading interface, and the width w and height H of a display buffer zone are obtained (Step 51). The width w of a reading interface is the width while it is read by held on hand(s). The display buffer zone is the dimension of the display RAM (random access memory) when the scrollbars are enabled. Herein, the width of the reading interface and the width of the display buffer zone are supposed to be identical with the value of w. The present invention may obtain the dimension of the reading interface after the settings are changed by the users.

In FIG. 3, after Step 51, the desired image data is written into the display buffer zone (Step 52, connecting to FIG. 4 for details) and printed on the display buffer zone (Step 53, connecting to FIG. 5 for details), and the display area of the image is updated (Step 54). Next, it is confirmed whether all the data has been shown or a termination instruction has been received (Step 55). If all the data has been shown or a termination instruction has been received, the type-setting is terminated (Step 56). If the data has not been all shown or a termination instruction has not been received yet, it is confirmed whether the changed display area of the image exceeds the display buffer zone (Step 57). If the changed display area of the image has exceeded the display buffer zone, it implies that the data stored in the display buffer zone is insufficient to provide a complete page on the reading interface. In such a case, the process returns to Step 52 for writing data into the display buffer zone again, and a loop is thus formed. It repeats until it is determined that all the data has been shown or a termination is needed in Step 55. Then, the type-setting is terminated (Step 56).

Figure 4:
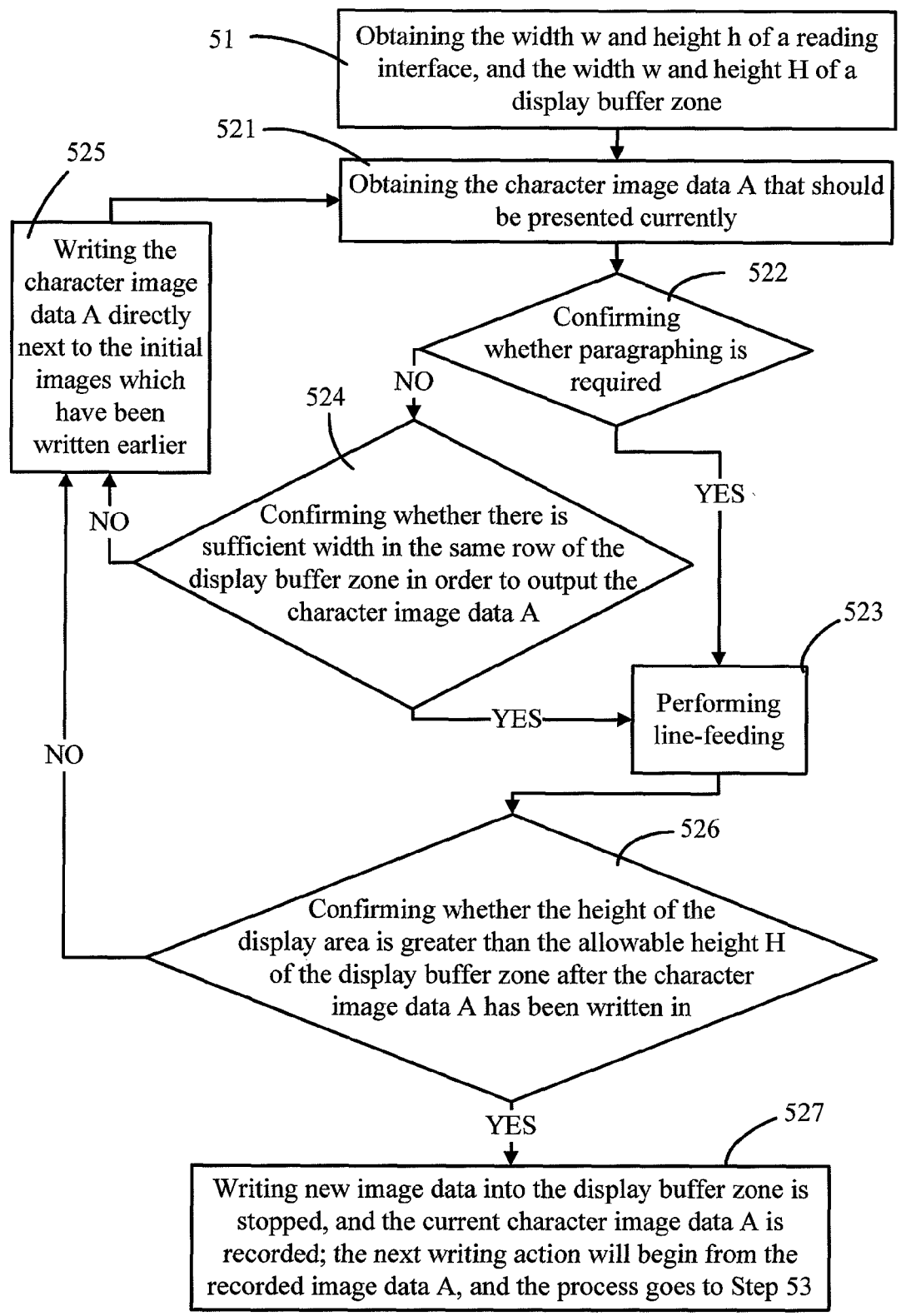
FIG. 4 is a flowchart showing the sub-steps of Step 52 "writing into a display buffer zone" according to one embodiment of the present invention.

Please refer to FIG. 4, it is a flowchart showing the sub-steps of Step 52, wherein the character image data is written into the display buffer zone in sequence. After Step 51, the character image data that should be presented currently is sequentially obtained (Step 521). The character image data is denoted by "A". Starting with an initial image of an original page, the character image data A is initialized to be the first image data required to be written into. In FIG. 4, a horizontal type-setting orientation file is used as an example for illustration, not a limitation.

After obtaining the character image data A (Step 521), we need to confirm whether paragraphing is required (Step 522). If paragraphing is necessary, line-feeding is performed to produce a new paragraph before presenting the character image data A (Step 523). On the contrary, if line-feeding is unnecessary, we have to confirm whether there is sufficient width in the same row of the display buffer zone in order to output the character image data A (Step 524). If there is no sufficient space for the character image data A, line-feeding is performed (Step 523). On the contrary, if there is sufficient space for the character image data A, the character image data A is written directly next to the initial images which have been written earlier (Step 525). Then, the process returns back to Step 521 to form a loop.

Accordingly, it provides a type-setting method for a text image file, which can achieve automatic line-feeding. The present invention uses the wording of "automatic" to imply that the users do not need to operate the scrollbars along a type-setting direction when reading. Regarding the type-setting direction, for example, when type-setting and printing the text in a horizontal orientation, the type-setting direction is horizontal. Thus, thanks to the automatic line-feeding of the present invention to adjust the printed text in light of reading interface, dragging the horizontal scrollbars may be avoided.

After Step 523 of performing line-feeding, we need to confirm whether the height of the display area is greater than the allowable height H of the display buffer zone after the character image data A has been written in (Step 526). The above-mentioned height H of the display buffer zone is obtained from Step 51. If the height of display buffer zone after writing the character image data A is smaller than the allowable height H of the display buffer zone, it implies that the display buffer still has enough space to write more image data and the process will loop to Step 525. On the contrary, if the height of the display buffer zone after writing the character image data is greater than the allowable height H of the display buffer zone, it implies that the space of the display buffer zone is insufficient for more writing. Accordingly, writing new image data into the display buffer zone is stopped, and the current character image data A is recorded (Step 527) so that the next writing action will begin from the recorded image data A. Next, the process goes to Step 53 (shown in FIG. 3) for printing the data of the display buffer zone.

Figure 5:
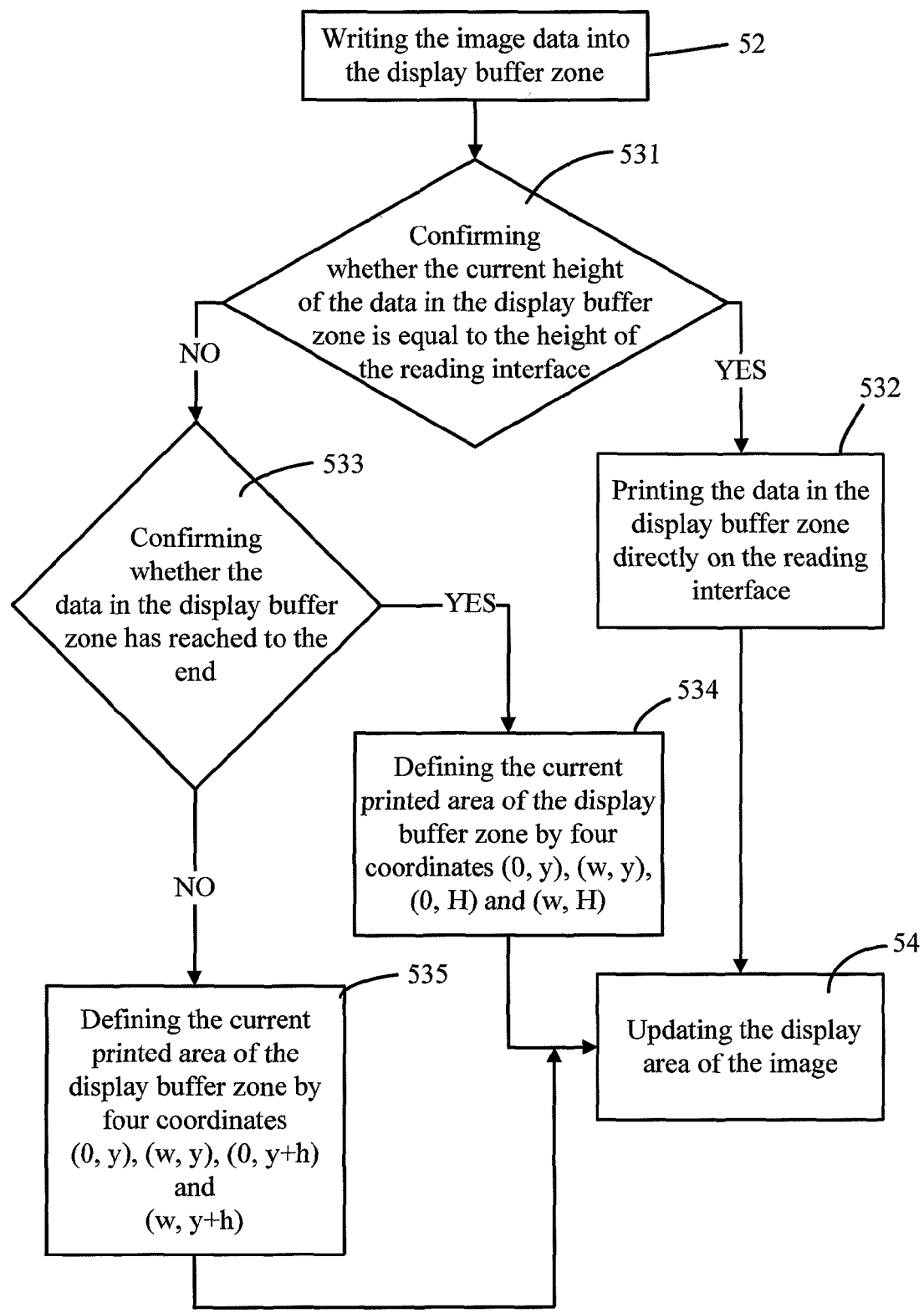
FIG. 5 is a flowchart showing the sub-steps of Step 53 "printing a display buffer zone" according to one embodiment of the present invention.
Figure 6A:
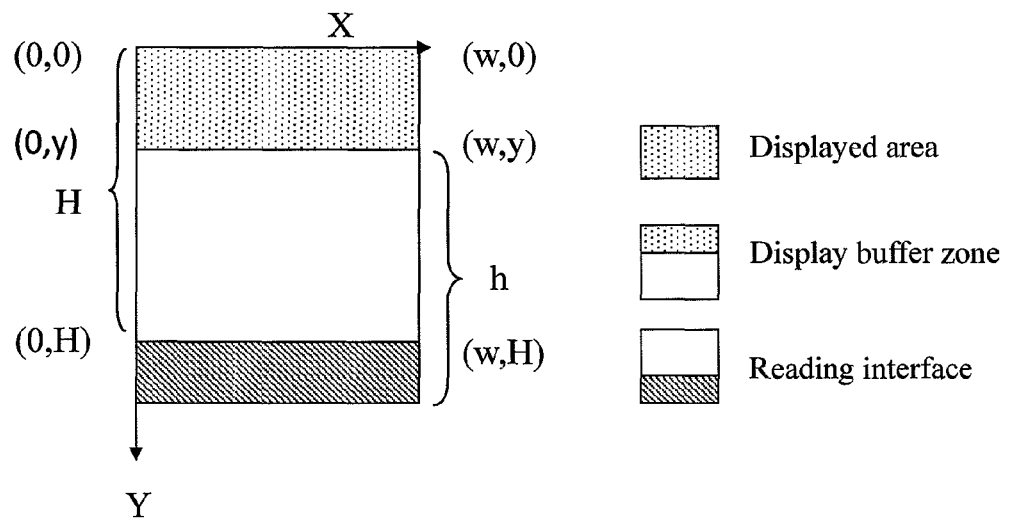
FIG. 6A is a diagram schematically showing the range of the display buffer zone where the data in the display buffer zone has reached the end.

Please refer to FIG. 5 which is a flowchart showing the sub-steps of Step 53. After the image data has been written into the display buffer zone in Step 52, we need to confirm whether the current height of the data in the display buffer zone is equal to the height of the reading interface (Step 531). If the two heights are identical, the data in the display buffer zone can be directly printed on the reading interface (Step 532). If they are not identical, we have to confirm whether the data in the display buffer zone has reached to the end (Step 533), and determine the printed area of the display buffer zone according to the dimensions of the reading interface and the display buffer zone. Please refer to FIG. 6A in which the data in the display buffer zone has reached to the end. Suppose that the preceding displayed height has reached to the position of "y" (the dotted area in FIG. 6A), the height of the display buffer zone is H (equal to the dotted area plus the white area in FIG. 6A), and the height of the reading interface is h (equal to the white area plus the oblique area). Thus, the display height h of the reading interface is greater than the current required display height (H−y), represented as h>H−y. In other words, the displayed data has reached to the bottom. Therefore, the current printed area of the display buffer zone is defined by four coordinates (0, y), (w, y), (0, H) and (w, H) (Step 534), wherein the coordinates are based on the X-Y coordinate shown in FIG. 6A.

Figure 6B:
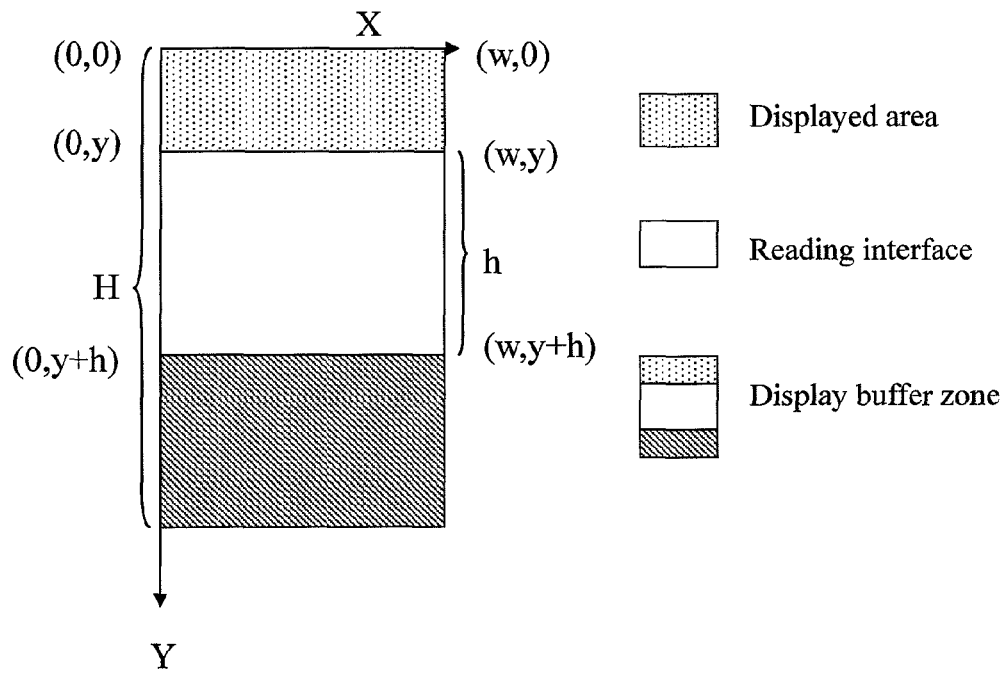
FIG. 6B is a diagram schematically showing the range of the display buffer zone where the data in the display buffer zone has not reached the end.

Refer to FIG. 6B for another case in which the data in the display buffer zone has not reached to the end. Suppose that the displayed area has reached to the position of "y" (the dotted area in FIG. 6B), the height of the reading interface is h (the white area in FIG. 6B), and the height of the display buffer zone is H (the combination of the dotted area, the white area and the oblique area in FIG. 6B). As the data in the display buffer zone has not reached to the end, the height of the display buffer zone H is greater than the height y of the displayed area plus the height h of the reading interface, represented as H>y+h. Therefore, the current printed area of the display buffer zone is equal to the area of the reading interface as defined by four coordinates (0, y), (w, y), (0, y+h) and (w, y+h) (Step 535). After the image data is printed on the display buffer zone, the process goes to Step 54 (shown in FIG. 5) for updating the area of the displayed images.

The present invention does not restrict the method to update the displayed image. Updating the displayed image can be realized via dragging the scrollbars or triggering the Page-Up or Page-Down key. Suppose that each downward operation of the scrollbar moves down the reading interface by a distance of d. If the initial coordinates of the reading interface is (0, y), the initial coordinates of the reading interface is moved down and updated to (0, y+d) after changing the displayed image.

The type-setting method for a text image file of the present invention comprises two primary processes: a text dividing process and a type-setting process. In the text dividing process, the present invention divides the text image file into a plurality of independent (individual) characters, and stores the characters in image formats and their related information. In the type-setting process, the present invention performs type-setting and automatic line-feeding of the divided characters. Thereby, the present invention efficiently shows text images according to the view dimension of the reading interface and provides the reading convenience without often dragging both the horizontal and vertical scrollbars to adjust the shown texts on the screen of the reading interface.

In summary, the present invention proposes a type-setting method for a text image file, which comprises two primary processes: a text dividing process and a type-setting process. In the text dividing process, the present invention divides the text image file into a plurality of independent and individual characters, and stores each character in an image format. In the type-setting process, the present invention performs type-setting and automatic line-feeding of the divided characters in light of the view dimension of the reading interface. Thereby, the present invention efficiently shows text images according to the reading interface and provides the reading convenience without often dragging both the horizontal and vertical scroll-bars to adjust the shown texts on the screen of the reading interface.

The embodiments described above are only to exemplify the present invention but not to limit the scope of the present invention. According to the specification and drawings of the present invention, a person skilled in the art should be able to make an equivalent embodiment without departing from the scope of the present invention. Thus, any modification or variation according to the spirit of the present invention is to be also included within the scope of the present invention, which is based on the claims stated below.

What is claimed is:

1. A type-setting method for a text image file, comprising steps of:
   (a) dividing the text image file into a plurality of character-string images along a first direction;
   (b) dividing each character-string image into a plurality of independent and individual character images along a second direction; and
   (c) performing type-setting and line-feeding of the independent and individual character images according to a reading sequence and a view dimension of a reading interface, wherein step (c) comprises sub-steps of:
   (c1) obtaining a width and a height of the reading interface, and obtaining a width and a height of a display buffer zone for writing into;
   (c2) writing each character image after the division of the text image file into the display buffer zone according to the width and the height of the display buffer zone;
   (c3) printing the display buffer zone on the reading interface according to the width and height of the reading interface;
   (c4) updating an image display area of the reading interface; and
   (c5) repeating from step (c1) to step (c4) until a termination instruction is received.

2. The type-setting method for a text image file according to claim 1, wherein, before step (a), it further comprises a step (a0): converting the text image file into a binary black-and-white image.

3. The type-setting method for a text image file according to claim 2, wherein the first direction is a horizontal direction and the second direction is a vertical direction.

4. The type-setting method for a text image file according to claim 3, wherein step (a) comprises sub-steps of:
   (a1) storing the number of black pixels of each pixel row in the text image file into a black-pixel row array; and
   (a2) locating an upper border and a lower border of each character-string image to perform a division along the first direction via boundaries of zero elements and non-zero elements of the black-pixel row array.

5. The type-setting method for a text image file according to claim 4, wherein, between step (a2) and step (b), it further comprises step (a3): if a spacing between the upper border of the current character-string image and the lower border of the preceding character-string image is greater than a threshold, paragraphing information needs to record and retrieve between the current character-string image and the preceding character-string image.

6. The type-setting method for a text image file according to claim 3, wherein step (b) comprises sub-steps of:
   (b1) storing the number of black pixels of each pixel column in the character-string image into a black-pixel column array;
   (b2) locating a left border and a right border of each character of each character-string image to perform a division along the second direction via boundaries of zero elements and non-zero elements of the black-pixel column array.

7. The type-setting method for a text image file according to claim 1, wherein in step (c2), if, in a row, the width of one image having been written into the display buffer zone plus a width of one character is greater than the width of the reading interface, the character image is written on the next row.

8. The type-setting method for a text image file according to claim 1, wherein in step (c2), if the height of one character image having been written into the display buffer zone plus a height of the character is greater than the height of the display buffer zone, writing is stopped, and step (c3) is proceeded.

9. The type-setting method for a text image file according to claim 1, wherein in step (c4), updating the image display area is realized via operating a scrollbar or triggering a page-up or a page-down key.

* * * * *